G. F. FOOTE.
Harvester and Thresher.
No. 16,052.
2 Sheets—Sheet 1.
Patented Nov. 11, 1856.
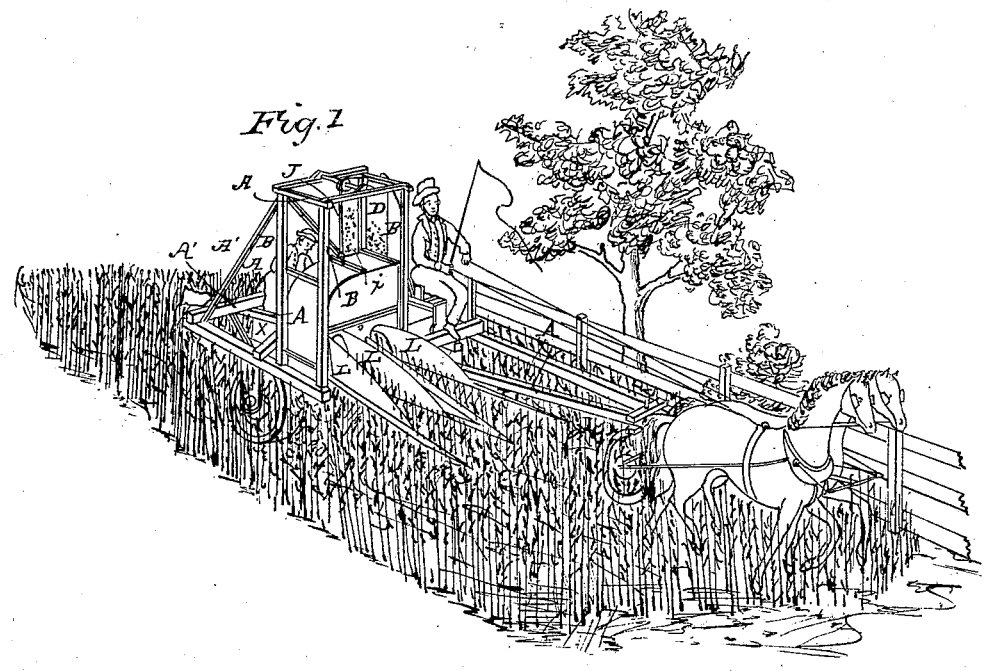
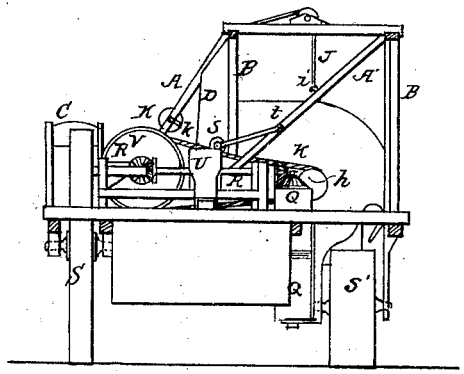
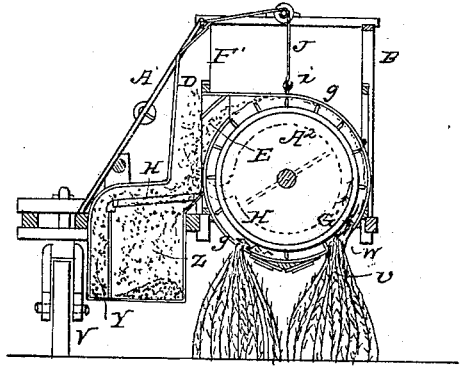
WITNESSES
INVENTOR

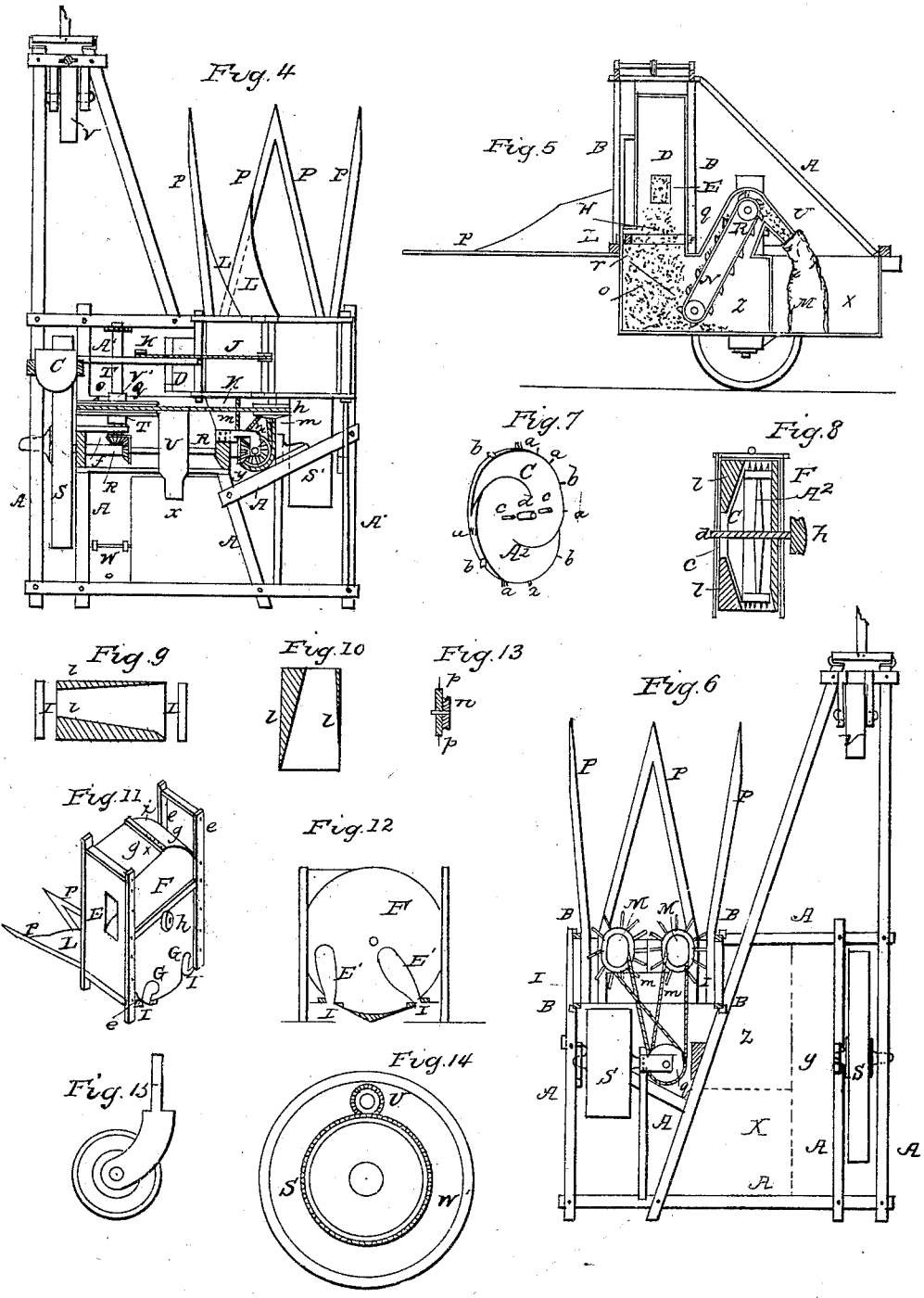

UNITED STATES PATENT OFFICE.

GEO. F. FOOTE, OF BUFFALO, NEW YORK.

IMPROVEMENT IN MACHINES FOR HARVESTING GRAIN.

Specification forming part of Letters Patent No. 16,052, dated November 11, 1856.

*To all whom it may concern:*

Be it known that I, GEORGE F. FOOTE, of the city of Buffalo and State of New York, have invented a new and useful Machine for Harvesting Grain; and I do hereby declare that the following is a full, clear, and exact description of the construction and operation of the same, reference being had to the annexed drawings, making a part of this specification, in which—

Figure I is a perspective view when operating in the field; Fig. II, transverse elevation, seen from behind; Fig. III, transverse section through center of the cylinder; Fig. IV, ground plan; Fig. V, longitudinal elevation section through elevator; Fig. VI, ground plan, with machine upside down; Fig. VII, perspective of cylinder $A^2$; Fig. VIII, longitudinal section of cylinder and case; Fig. IX, horizontal section of the lower part of cylinder-case; Fig. X, vertical section of the cylinder-case, right side; Fig. XI, perspective of cylinder-case F; Fig. XII, front elevation of cylinder-case F; Fig. XIII, transverse section of gathering-wheels M M; Fig. XIV, section of driving-wheel, five feet diameter, spur-gearing W', three feet diameter, U, small wheel, connected with shaft R, Figs. II and IV; Fig. XV, caster-wheel. (See V, Fig. I, IV, and VI.)

The horizontal frame A A A A, Figs. IV and VI, is made of hard wood, three by five inches, bolted together, seven and a half feet wide by twelve (12) feet long. The upright frame B B B, Figs. I, II, III, V, is made of hard wood, three inches square, the inner corner rabbeted to receive the frame of the cylinder-case. The cylinder is six inches long at the periphery by three feet in diameter, Fig. VII, made like an ordinary band-wheel, with radial arms of iron or hard wood, rim four inches thick, eight rows of spikes, *a a*, projecting one and a half inch, and four bars or fans of thin iron, *b b*, projecting one inch beyond the periphery and placed lengthwise.

In front and as part of the cylinder $A^2$ is a conical scroll-like projection, *c*, Figs. VII and VIII. Its length is six inches at the center, with a flat apex of one foot in diameter, from which it tapers off to a feather-edge at the circumference. In this is cut two or more spiral screws, commencing at opposite sides of the apex, extending around and terminating at the circumference and at opposite sides from where they began. This should be prominent and of a V shape. It may be made of hard wood or sheet-iron. At the outer edge of the apex and at opposite sides, projecting two inches, are two or more pins, of iron, one-half inch in diameter.

The cylinder is inclosed, so as to revolve freely, in a case, Figs. VIII and XI. The circumference *g g* is made of sheet-iron, the front and back of hard-wood boards, one and one-fourth inch thick, to which are fastened the journal-bearings of the cylinder. To this also is made fast the frame *e e e*, one and a half by three inches, of hard wood, the whole of such dimensions as to easily fit and slide in the upright frame B B B, Figs. I, II, III. The inside of the case is filled with wood or sheet-iron conforming partly to the shape of the cylinder, and as shown by Figs. VIII, IX, and X, *l l l l*.

The case has two openings in front, E' E', Fig. XII, and two smaller ones behind, G G, Fig. XI. These are two feet apart at the bottom, and are connected by an opening through the sheet-iron I I I, Figs. VI and IX. These openings I call the "straw-passages," and should be about two inches wide. From each side of these passages extend forward five feet diverging arms, pointed at the ends P P P P, Figs. I, IV, V, VI, and IX, the two outer ones being distant from each other at the point four feet.

From the sides of the openings E' E' extend pieces of sheet-iron along arms P P to about half their length, (see L, Figs. X and XI.) Upon the bottom and on the inner side of the straw-passages and upon the front edge of the cylinder-case are gathering-wheels M M, one foot in diameter, with tines projecting three inches. On the bottom of each is a pulley, *n*. (See Figs. VI and XIII.)

On top of the cylinder is a box. *x*, through which are driven teeth, projecting into the concave, so that the spikes of the cylinder shall pass between them. (See Fig. XI.)

*i* is a hook, to which is attached the rope J for raising and lowering the cylinder and case by turning the crank K, Figs. II and III.

Suspended from the frame surrounding the space X Y Z, Fig. VI, is a sheet-iron or wood box about two feet deep. This is divided into three parts by partitions. The spaces Z and Y are covered air-tight. Y has a door, W, Fig.

IV. Over the box Z is a sieve or screen, H, Figs. III and V, vibrated by beveled projections $o$ $o$ upon the side of the band-wheel V, Fig. IV, and a spring, $r$, Fig. V.

The cover to boxes Z and Y extends six inches above the sieve, connecting with the upright box D, and with it, is made of sheet-iron. Box D is inclosed on three sides, opening against and fitting to the side of the cylinder-case, Figs. II and III.

N, Fig. V, is an elevator carried by a band-wheel on the shaft R R, inclosed with air-tight box and emptying into a spout, U, Figs. II, IV, V, to which is suspended a grain-bag, M.

O, Fig. V, is a slanting board to guide the grain into the elevator.

S, Figs. XIV, II, IV, VI, is the driving-wheel, which rotates the shaft R R. From this, by bevel-gear, the shaft T and band-wheel V is rotated, and from this, with the band $k$ around the pulley $h$, the cylinder is rotated.

To tighten the band, a roller, S, Fig. II, is attached to the frame so as to have a free motion up and down.

The end of the shaft R R, by bevel-gear, drives the upright drum Q, Figs. II, IV, VI. From this drum belts $m\,m\,m\,m$ pass around the pulleys of the gathering-wheels M M, Fig. VI.

The operation is as follows: The horses which draw the machine are driven at a brisk walk by the side of the unthrashed grain, the off horse walking in the track made by the wheel S' in its former round. This brings the gathering-bars P P P P so as to embrace four feet of the unthrashed grain in two separate parcels. This is gradually bent toward the center of each parcel, Fig. III, until it comes to the opening E', when the tine-wheel forces it into the straw-passages I I, where it is bent by the pins $c$ $c$ and the scroll C, Figs. VII and VIII, to the concave of the cylinder-case and immediately in contact with the teeth of the cylinder, which combs off the grain, and the straw, moving through, passes out at G G, Fig. XI. The centrifugal force given the thrashed grain, together with the currents of air produced by the fans on the cylinder, carries it over in the direction of the arrow, Fig. III, through the opening E into the upright box D. Thence it falls onto and through the sieve H into the box Z, when it is carried by the elevator N, Fig. V, and thrown through the spout U into the bag M', which, when full, is replaced by another. The broken heads and straws that may pass over with the grain are separated by the sieve and fall into the box Y, from which they are removed from time to time. The currents of air set in motion by the fans of the cylinder pass out over the thrasher at F', Fig. III, and with it the chaff and dust.

Should there not be air enough to remove the dust and chaff from all kinds of grain, an ordinary fan-blower of about two feet diameter and four inches long may be attached to the shaft of the cylinder between the pulley and the cylinder, the air from which may be conducted so as to blow up through the falling grain in the box D. (See the red dotted lines, Fig. III.)

It will be seen that the grain received through the left-hand opening, H', has to pass over the right-hand opening, G', Fig. III. To prevent its falling through, the left-hand side of the straw-passage $v$ should be brought as close to the cylinder as it can without hitting, while the cylinder-case of the opposite side, $w$, should have a slanting direction downward, so as to catch the grain as it comes in a centrifugal line from the opposite side.

The thrasher is raised or lowered by the driver to suit the different heights of grain that may occur by turning the crank K, from which a strap or rope going to his foot will enable him to hold it in any position he may have adjusted it.

The gearing should be so arranged as to give the cylinder about two hundred revolutions per minute at an ordinary walk, and so as to give the tines of the gathering-wheels M M a backward motion along the straw-passage equal to the forward motion of the machine.

It will be seen from the above description of my improved grain-harvesting machine that the same mechanism by which the grain is harvested also separates and cleans the grain from the straw, chaff, and dust.

Having described my improved machine for harvesting grain, what I claim as my invention, and desire to secure by Letters Patent, is—

The peculiar-constructed scroll-cylinder $A^2$, in combination with the cylinder-case F and the gathering-wheels M M, when the same are constructed and arranged to operate in relation to each other and the main frame A in the manner and for the purposes herein set forth.

GEO. F. FOOTE.

Witnesses:
J. M. HAYES,
THOS. T. HAYES.